2 Sheets--Sheet 1.

L. THOMAS.

Machines for Rolling Metal.

No. 6,216. Reissued Jan. 12, 1875.

Witnesses
John Becker
Fred. Haynes

Leopold Thomas
by his Attorneys
Brown & Allen

2 Sheets--Sheet 2.

L. THOMAS.

Machines for Rolling Metal.

No. 6,216.

Reissued Jan. 12, 1875.

Witnesses.
John Becker
Fred Haynes

Leopold Thomas
by his Attorneys
Brown & Allen

UNITED STATES PATENT OFFICE.

LEOPOLD THOMAS, OF HOBOKEN, NEW JERSEY, ASSIGNOR TO THE AMERICAN HOT-ROLLED-SHAFTING COMPANY, OF NEW YORK CITY.

IMPROVEMENT IN MACHINES FOR ROLLING METAL.

Specification forming part of Letters Patent No. 120,838, dated November 14, 1871; reissue No. 6,216, dated January 12, 1875; application filed November 19, 1874.

*To all whom it may concern:*

Be it known that I, LEOPOLD THOMAS, formerly of Pittsburg, in the county of Allegheny and State of Pennsylvania, but now of Hoboken, in the county of Hudson and State of New Jersey, have invented a new and Improved Machine for Rolling Metal; and I do hereby declare that the following is a full, clear, and exact description thereof, reference being had to the accompanying drawing, making part of this specification, and in which—

Figure 1:
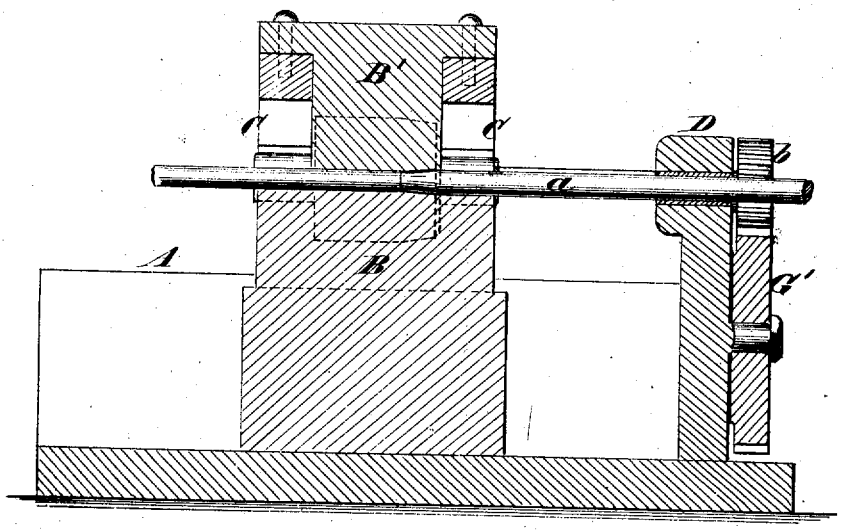
Figure 2:
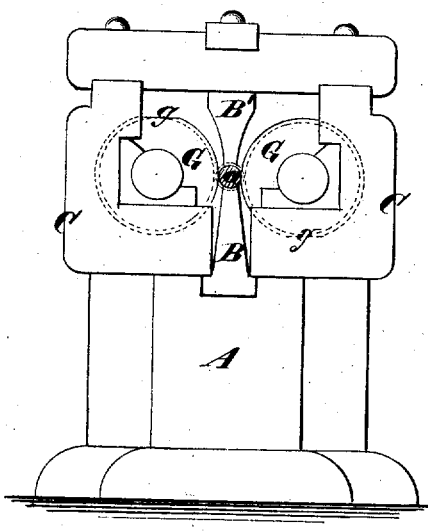
Figure 3:
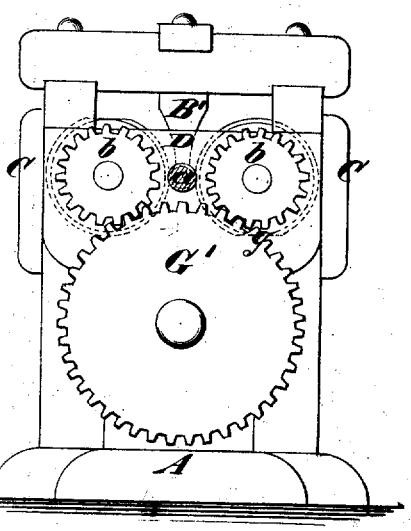
Figure 4:
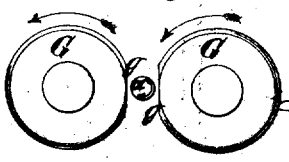
Figure 5:
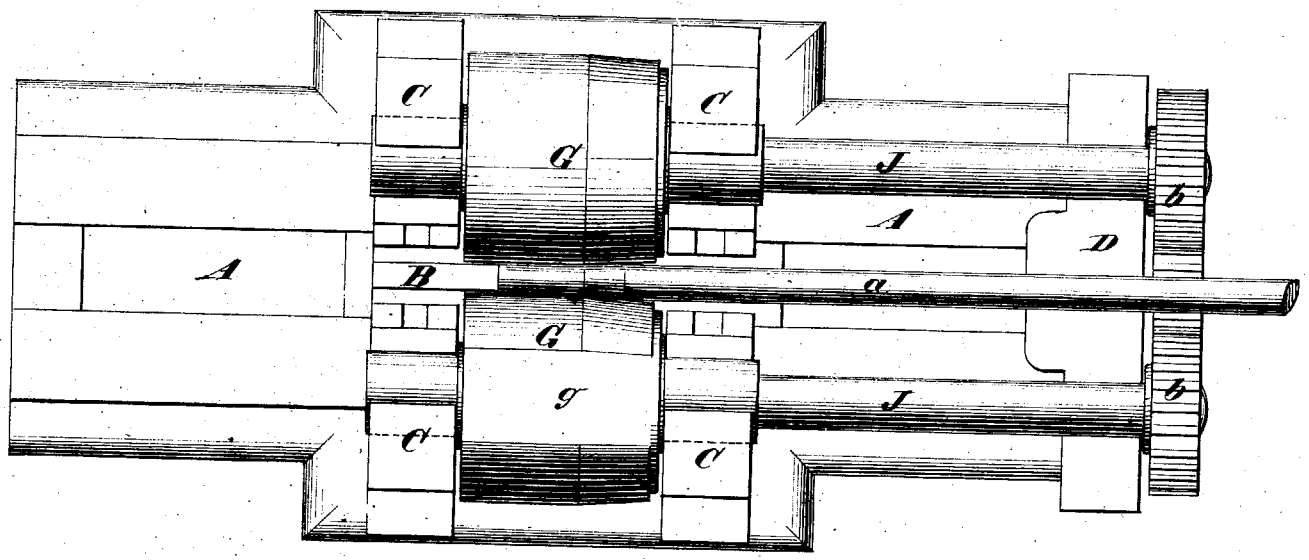

Figure 1 is a section taken longitudinally and in a vertical plane through the center of the machine. Fig. 2 is an elevation of one end of the machine. Fig. 3 is an elevation of the opposite end of the machine. Fig. 4 is an end view of the rolls. Fig. 5 is a top view of the machine with the upper guide removed.

This invention, which is applicable to rolling metallic bars or shafts and similar articles either in a hot or cold state, relates to rolling-mills or machines for rolling bars, shafts, or like articles lying parallel to the axis of the rolls, such mills comprising a pair of rolls made to rotate in the same direction, and a guide or guides for confining in proper position the article to be rolled.

The invention consists, as an improvement on such a mill, in a construction of one or both of the rolls with a portion of the peripherical surface flattened or recessed, by which such portion is brought nearer to the axis of the roll than the remainder of the periphery, and whereby the introduction of the bar or shaft between the rolls is facilitated.

In the example represented in the accompanying drawing, a rolling-machine is shown having a single pair of rolls, both of which have a portion of their peripherical or perimetrical surfaces flattened or recessed, as described. This provides for a sufficient space between the rolls, at each revolution of the latter, for feeding in the metal to be rolled.

A is the bed-frame of the machine, from which rise standards C C, that support two rolls, G G, and a guide, B′. The journals of the rolls G G are supported by unyielding boxes, which are seated in the standards C, as shown in Fig. 2.

Said rolls are here represented as being horizontally arranged on opposite sides of the center of the machine, and their axes are parallel with each other. These rolls, which may be generally defined as plain-surfaced and cylindrical, are of equal size.

The flat places or depressions hereinbefore referred to on the surfaces of said rolls, for the purpose of affording sufficient space between them for feeding in the metal to be rolled at each revolution of the rolls, are indicated by the letter *g*.

This feeding in and the gradual reduction of the metal bars being worked are greatly facilitated by making the rolls of a tapering form at their ends where the metal is introduced.

In the several figures of the drawing, *a* represents a bar, rod, or shaft which is being fed through the machine, and B B′ are two guides, which are arranged one above and the other below the course taken by said shaft, for supporting the latter and holding it positively in its proper place—that is, with its axis parallel to and in like horizontal relation with the axes of the rolls G G, as shown in Fig. 2. From one end of each roll G extends a shaft, J, which is supported in journal-boxes on a standard, D, and carries a pinion, *b*. These pinions *b b* both engage with a driving spur-wheel, G′, in such manner that the rolls G G will both be rotated in the same direction, as shown by arrows in Fig. 4, and the bar or shaft which is being reduced and polished will be continually rotated while passing through the machine. Between the two pinions *b b* a hole is made in the standard D, the axis of which hole should coincide with the horizontal plane in which the axes of the rolls G lie, and with a vertical plane passing through the centers of the guides B B′.

The machine, as above described, is applicable to finishing shafts and other metal objects, by reducing them very slightly after they have been passed between ordinary rolls, and for truing and polishing the shaft at one passage through the machine. Thus, the metal shafts, rods, or bars to be worked are first heated and rolled in an ordinary rolling-machine until they are reduced to a diameter a little greater than is required when they are finished. The rods may then be allowed to cool down to a dark cherry-red heat, and be introduced between the rolls G G of the machine shown in the drawing.

The feeding of the rods between the rolls G G, and entirely through the machine, may be effected by hand once during each revolution of the rolls when the flat surfaces *g g* are nearest to and face each other, as indicated in Fig. 4, and when the rod is relieved from the pressure of the rolls.

I claim—

An improvement in a rolling-mill for rolling bars, shafts, or other articles lying parallel to the axes of the rolls, comprising a pair of rolls rotating in the same direction and a guide for confining the article to be rolled in proper position, the flattened or recessed surface on one or both rolls to facilitate the introduction of the article to be rolled, substantially as specified.

LEOPOLD THOMAS.

Witnesses:

FRED. HAYNES,
FERD. TUSCH.